C. F. HOLDEN.
BIRD-CAGE.

No. 170,671. Patented Dec. 7, 1875.

Witnesses:
W. J. Cambridge
W. H. Hall

Inventor,
Charles F. Holden
per Teschemacher & Stearns
Attys

UNITED STATES PATENT OFFICE.

CHARLES F. HOLDEN, OF BOSTON, MASSACHUSETTS.

IMPROVEMENT IN BIRD-CAGES.

Specification forming part of Letters Patent No. 170,671, dated December 7, 1875; application filed October 19, 1875.

*To all whom it may concern:*

Be it known that I, CHARLES F. HOLDEN, of Boston, in the county of Suffolk and State of Massachusetts, have invented an Improvement in Bird-Cages, of which the following is a full, clear, and exact description, reference being had to the accompanying drawings, making part of this specification, in which—

Figure 1:
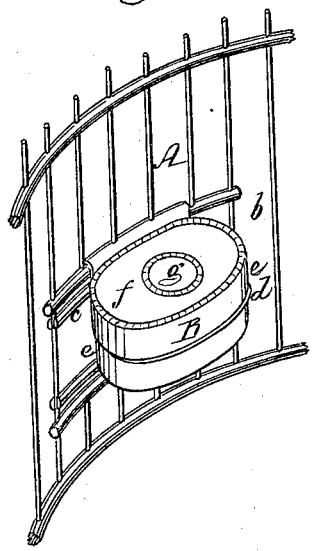
Figure 2:
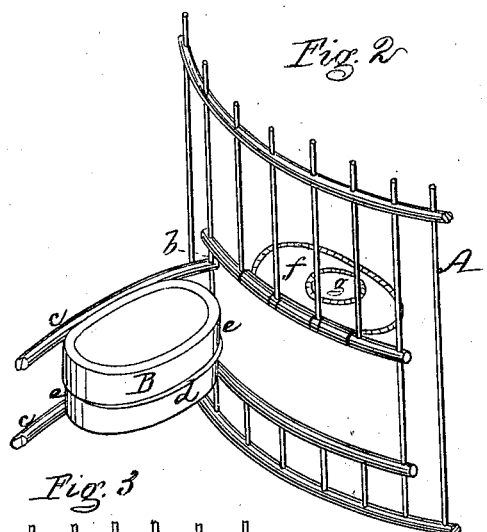
Figure 3:
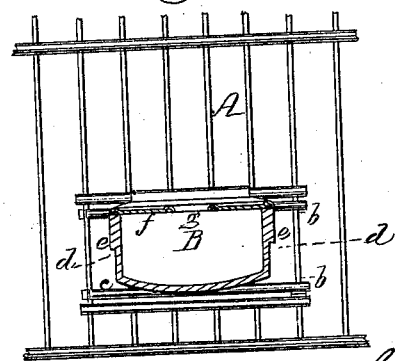

Figure 1 is a perspective view of a portion of a bird-cage having my improvement applied thereto. Fig. 2 is a perspective view of the same, the position of the parts being changed. Fig. 3 is a vertical section.

The object of my invention is to so arrange within a bird-cage the dish or receptacle for containing the food or water, that, while free access is afforded thereto, the scattering and waste of the seed or other food, or the sprinkling of water, will be entirely prevented; and my invention consists in a guard-plate projecting from the interior of the cage, in combination with a food dish or receptacle, the guard-plate being so arranged as to form a cover for the receptacle when the latter is in place within the cage.

To enable others skilled in the art to understand and use my invention, I will proceed to describe the manner in which I have carried it out.

In the said drawings, A represents a portion of the side of a bird-cage, to which is hinged at $b$ a small door, $c$. To this door is secured, by means of a wire holder, $d$, a dish or receptacle, B, of glass, or other suitable material, for containing food or water. This receptacle is provided at each end with an ear or projection, $e$, which rests upon the wire-holder $d$, and when the door $c$ is swung out, as seen in Fig. 2, the dish B is brought into a convenient position for refilling; or it may be easily lifted out of the holder $d$, if desired. To the upper portion of the frame of the door $c$ is secured a thin metal plate, $f$, which projects from the inside of the cage over and in close proximity with the top of the receptacle B, serving as a guard or cover therefor when in place within the cage, the plate being of curved form so as to fit closely around the upper edge of the receptacle. At the center of the plate $f$ is a circular aperture, $g$, of sufficient diameter to allow the bird to have free access through it to the dish B containing the food or water, which is, however, prevented by the guard-plate from being scattered around or thrown out of the cage, and consequently wasted, as is the case in bird-cages as heretofore constructed.

Furthermore, the guard-plate serves to prevent, in a great measure, the entrance of excrement from the bird within the food-receptacle, an advantage of considerable importance. The bottom of the interior of the receptacle B is concave, which causes the contents to gravitate toward the center immediately beneath the aperture $g$ in the guard-plate $f$, thus enabling the bird to conveniently reach the food or water when the receptacle is nearly empty; and it will be seen that the oval form of the food-receptacle, and the position in which it is secured, prevent it from extending far out over the floor, and obstructing the interior of the cage.

The guard-plate $f$ may be provided with one or more apertures, $g$, as desired; or may be of such shape as to leave a portion of the top of the receptacle uncovered, and the door $c$, instead of being hinged, may be arranged to slide, or be otherwise applied to the aperture which it is intended to close, and the receptacle B may be attached to the door $c$ by any suitable device other than the wire $d$.

If desired, the food-receptacle may be of such form that a portion only will project through an opening in the side of the cage in a well-known manner, in which case the receptacle would not require to be attached to a door, $c$, but would be retained in place by a suitable device, the open portion of the receptacle projecting into the cage being covered by a guard-plate, $f$. I prefer, however, the construction first described.

What I claim as my invention, and desire to secure by Letters Patent, is—

In combination with a food dish or receptacle, B, the guard-plate $f$, projecting from the interior of the cage, and so arranged as to form a cover for the food-receptacle when in place, substantially as and for the purpose set forth.

Witness my hand this 10th day of September, A. D. 1875.

CHARLES F. HOLDEN.

In presence of—
P. E. TESCHEMACHER,
W. H. HALL.